United States Patent [19]

Kukainis et al.

[11] Patent Number: 5,311,960
[45] Date of Patent: May 17, 1994

[54] TWO PIECE MULTIFUNCTIONAL COMPOSITE STRUCTURAL CROSS VEHICULAR BEAM

[75] Inventors: Janis Kukainis; Ali Kazemi, both of Northville, Mich.

[73] Assignee: Ford Motor Company, Dearborn, Mich.

[21] Appl. No.: 992,362

[22] Filed: Dec. 17, 1992

[51] Int. Cl.$^5$ ............................................. B62D 25/14
[52] U.S. Cl. ...................................... 180/90; 280/732; 280/752; 296/70
[58] Field of Search ................ 180/90; 280/732, 748, 280/750, 751, 752; 296/70, 72, 192; 454/69, 127

[56] References Cited

U.S. PATENT DOCUMENTS

| | | | |
|---|---|---|---|
| 3,287,980 | 11/1966 | Gilliland | 73/493 |
| 3,590,136 | 6/1971 | Kunishi et al. | 174/50 |
| 3,861,486 | 1/1975 | Wilfert | 180/90 |
| 4,105,223 | 8/1978 | Oda et al. | 280/752 |
| 4,455,338 | 6/1984 | Henne | 428/137 |
| 4,518,172 | 5/1985 | Bortz et al. | 180/90 X |
| 4,662,649 | 5/1987 | Ikeda et al. | 280/752 |
| 4,717,195 | 1/1988 | Okuyama et al. | 296/72 |
| 4,759,568 | 7/1988 | Paefgen et al. | 280/732 |
| 4,909,566 | 3/1990 | Hashimoto et al. | 296/192 |
| 5,088,571 | 2/1992 | Burry et al. | 180/90 |

*Primary Examiner*—David M. Mitchell
*Assistant Examiner*—Andrew C. Pike
*Attorney, Agent, or Firm*—Damian Porcari; Roger L. May

[57] ABSTRACT

A multifunctional structural cross vehicular beam assembly extending across substantially the entire width of the vehicular compartment between a cowl and a instrument panel. The beam supports the steering column of the vehicle so that the first bending mode frequency of the combination of the steering wheel and the beam is greater than the first bending mode frequency of the body and is different from the idle excitation frequency of an engine employed in the vehicle. A plastic cover is connected to the beam for defining channels of an air distribution system for the passenger compartment.

19 Claims, 5 Drawing Sheets

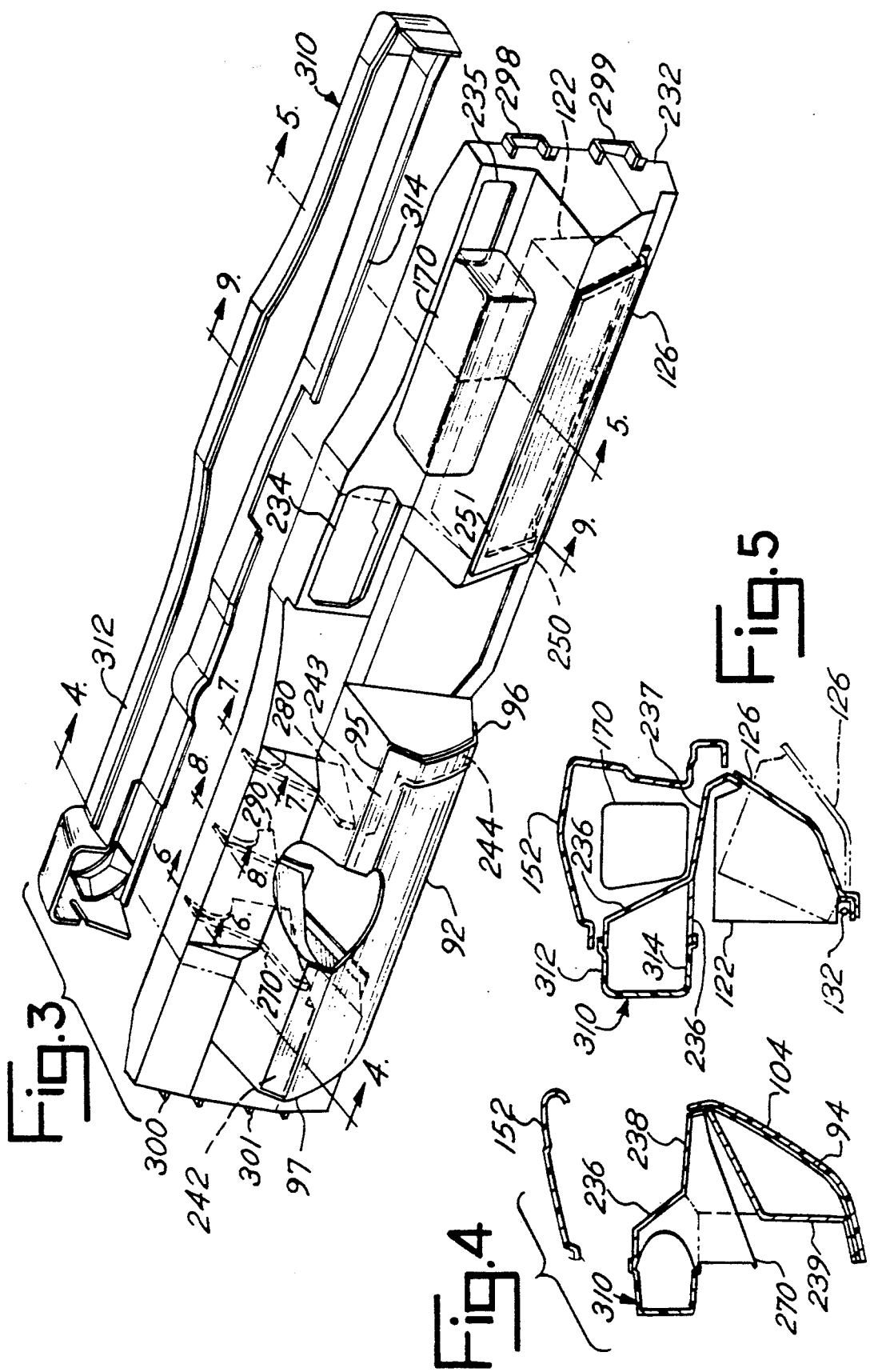

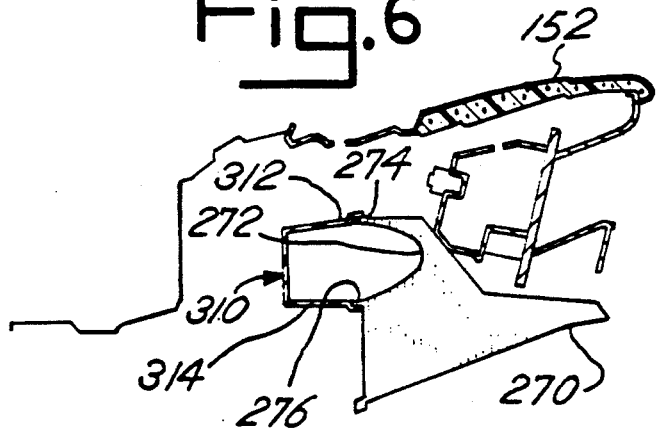
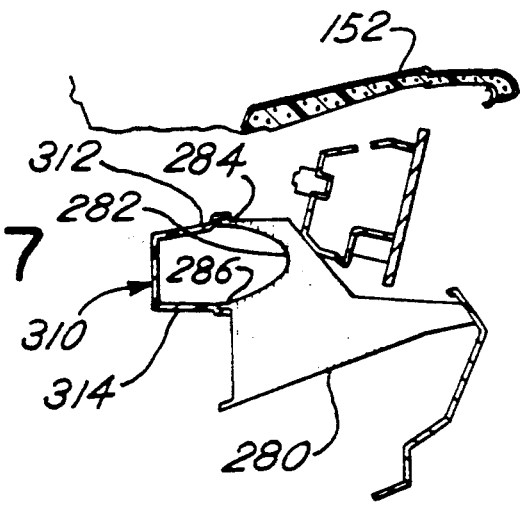
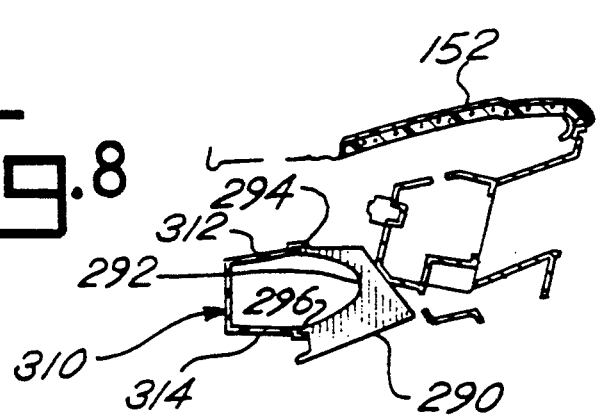

TWO PIECE MULTIFUNCTIONAL COMPOSITE STRUCTURAL CROSS VEHICULAR BEAM

FIELD OF THE INVENTION

This invention is directed to a cross vehicular assembly for supporting an instrument panel and a steering column. More particularly, the vehicular assembly also includes means for supporting an airbag and knee bolsters and for defining air distribution inlets.

BACKGROUND OF THE INVENTION

Cross vehicular assemblies incorporating ducts for a vehicular air distribution system suitable for fabrication from thermal plastic material have been disclosed in the past. Such ducts are disclosed in U.S. Pat. No. 4,791,964 (Van Kirk-issued Dec. 20, 1988) and U.S. Pat. No. 4,811,760 (Van Kirk et al.-issued Mar. 14, 1989).

Vehicular knee bolsters also have been disclosed in the past. For example, a knee bolster for a glove compartment incorporating some plastic parts is disclosed in U.S. Pat. No. 4,662,649 (Ikeda et al.-issued May 5, 1987).

Vehicular beams extending over substantially the entire width of a passenger compartment for defining air supply channels and for supporting an instrument panel and an airbag also have been disclosed in the past. One such beam is disclosed in U.S. Pat. No. 4,759,568 (Paefgen et al.-issued Jul. 26, 1988).

In spite of the improvements described in the foregoing patents, there is a need for a cross vehicular assembly with sufficient strength and reliability to support a steering column in order to improve the structural feel of the steering column, to reduce weight and to reduce assembly time. In the past, such a multifunctional assembly required the use of steel reinforcements or frames to provide structure for passive restraint of a vehicular occupant's lower torso. The use of steel reinforcements or frames increases weight, the difficulty of assembly and the probability of squeaks and rattles.

Accordingly, there is a need for an improved cross vehicular assembly for reinforcing knee bolsters, defining ducts for an air distribution system and supporting an instrument panel that decreases weight, costs and the probability of squeaks and rattles, while increasing reliability and ease of assembly. There is also a need for an improved cross vehicular assembly that can support a steering column in order to improve the structural feel of the steering column.

SUMMARY OF THE INVENTION

According to a first aspect of the invention, a multifunctional, structural cross vehicular beam assembly is used to support an instrument panel, an airbag mechanism, a driver knee bolster, a passenger knee bolster, and a steering column of a motorized vehicle operable by a driver. The vehicle includes a body having a cowl and a compartment for one or more passengers. In such a vehicular environment, the beam assembly preferably comprises a beam extending across substantially the entire width of the compartment between the cowl and the instrument panel. The beam is integrally formed and comprises a first means for defining a first cavity enabling deformation of the driver knee bolster. The first means also stabilizes the position of the driver knee bolster with respect to the vehicular body so that the driver knee bolster absorbs kinetic energy resulting from impact. The beam also comprises a second means for defining a second cavity enabling deformation of the passenger knee bolster. The second means also stabilizes the position of the passenger knee bolster with respect to the vehicular body so that the passenger knee bolster absorbs kinetic energy resulting from impact. The beam further comprises a third means for supporting an airbag mechanism, and a fourth means for supporting the steering column to improve the structural feel of the steering column. The beam also comprises a fifth means for defining air distribution inlets for the passenger compartment, and sixth means for supporting the instrument panel. The beam assembly further comprises a cover connected to the beam for defining channels of an air distribution system for the passenger compartment.

According to a second aspect of the invention, a multifunctional, structural cross vehicular beam assembly supports an instrument panel and a steering column of a motorized vehicle operable by a driver. The steering column has a first bending mode frequency. The vehicle includes an engine having an idle excitation frequency, as well as a body having a cowl and a compartment for one or more passengers. The body also has a first bending mode frequency. In such a vehicular environment, the beam assembly preferably comprises a beam extending across substantially the entire width of the compartment between the cowl and the instrument panel. The beam integrally comprises means for supporting the steering column so that the first bending mode frequency of the combination of the steering column and the beam is greater than the first bending mode frequency of the body and is different from the idle excitation frequency of the engine. The assembly also comprises means for attaching the instrument panel to the beam and a cover connected to the beam for defining channels of an air distribution system for the passenger compartment.

By using the foregoing techniques, the feel of the steering column may be improved and an instrument panel and knee bolster may be supported while significantly reducing the weight of the overall assembly and reducing the complexity and cost of incorporating the assembly into a vehicle.

BRIEF DESCRIPTION OF DRAWINGS

The detailed description of certain preferred embodiments of the invention is provided below with reference to the accompanying drawings, wherein the same reference numeral is used for a given feature in all figures.

FIG. 3 is an enlarged, perspective, exploded view of the beam assembly illustrated in FIG. 2 with knee bolsters and an airbag mechanism attached.

FIG. 4 is a cross sectional view taken along line 4—4 in FIG. 3.

FIG. 5 is a cross sectional view taken along FIG. 5—5 in FIG. 3.

FIG. 6 is a cross sectional view taken along line 6—6 in FIG. 3.

FIG. 7 is a cross sectional view taken along line 7—7 in FIG. 3.

FIG. 8 is a cross sectional view taken along line 8—8 in FIG. 3.

DETAILED DESCRIPTION OF CERTAIN PREFERRED EMBODIMENTS

Figure 1:
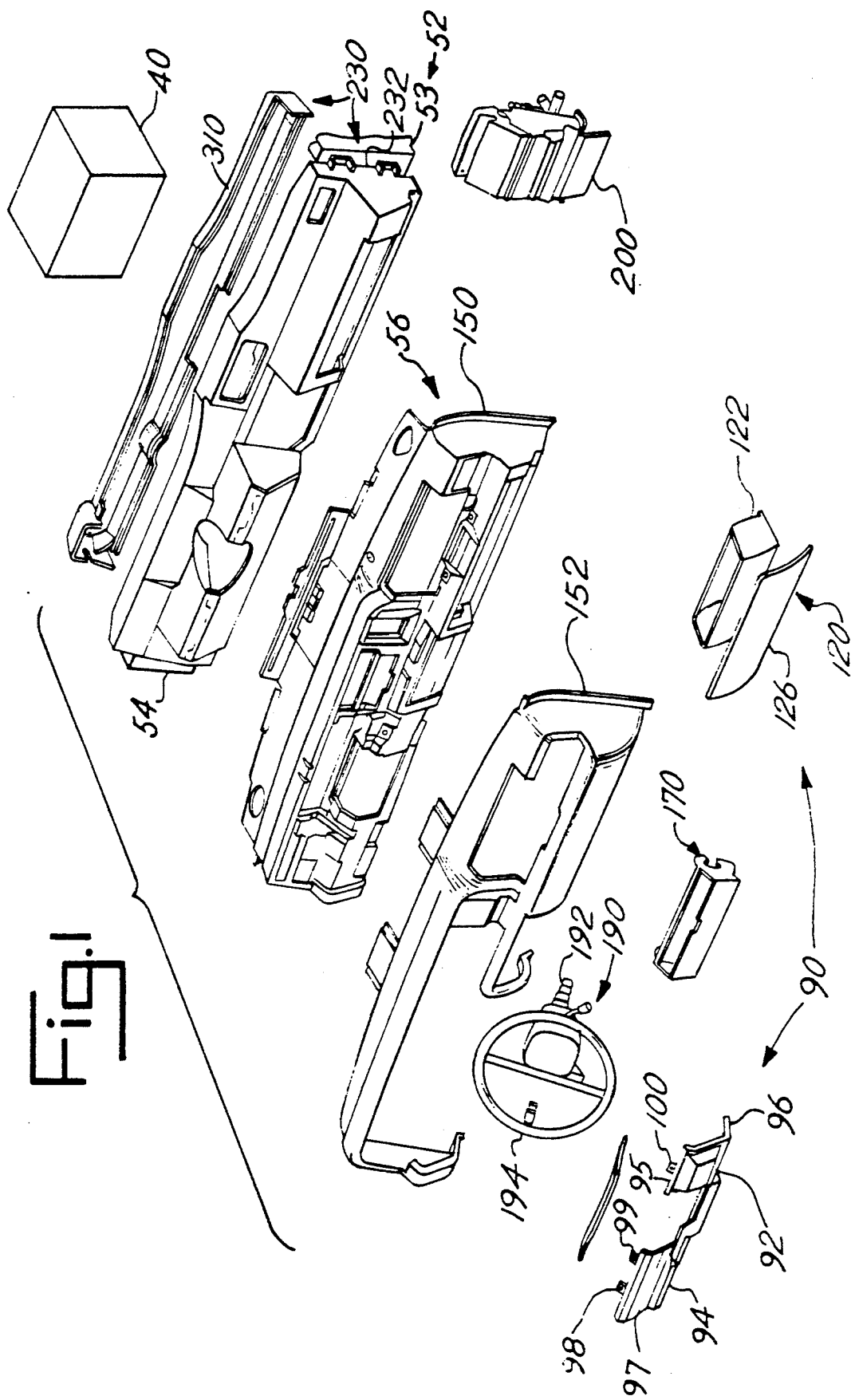
FIG. 1 is a exploded, perspective view of a multifunctional cross vehicular assembly made in accordance with a preferred embodiment of the invention.
Figure 2:
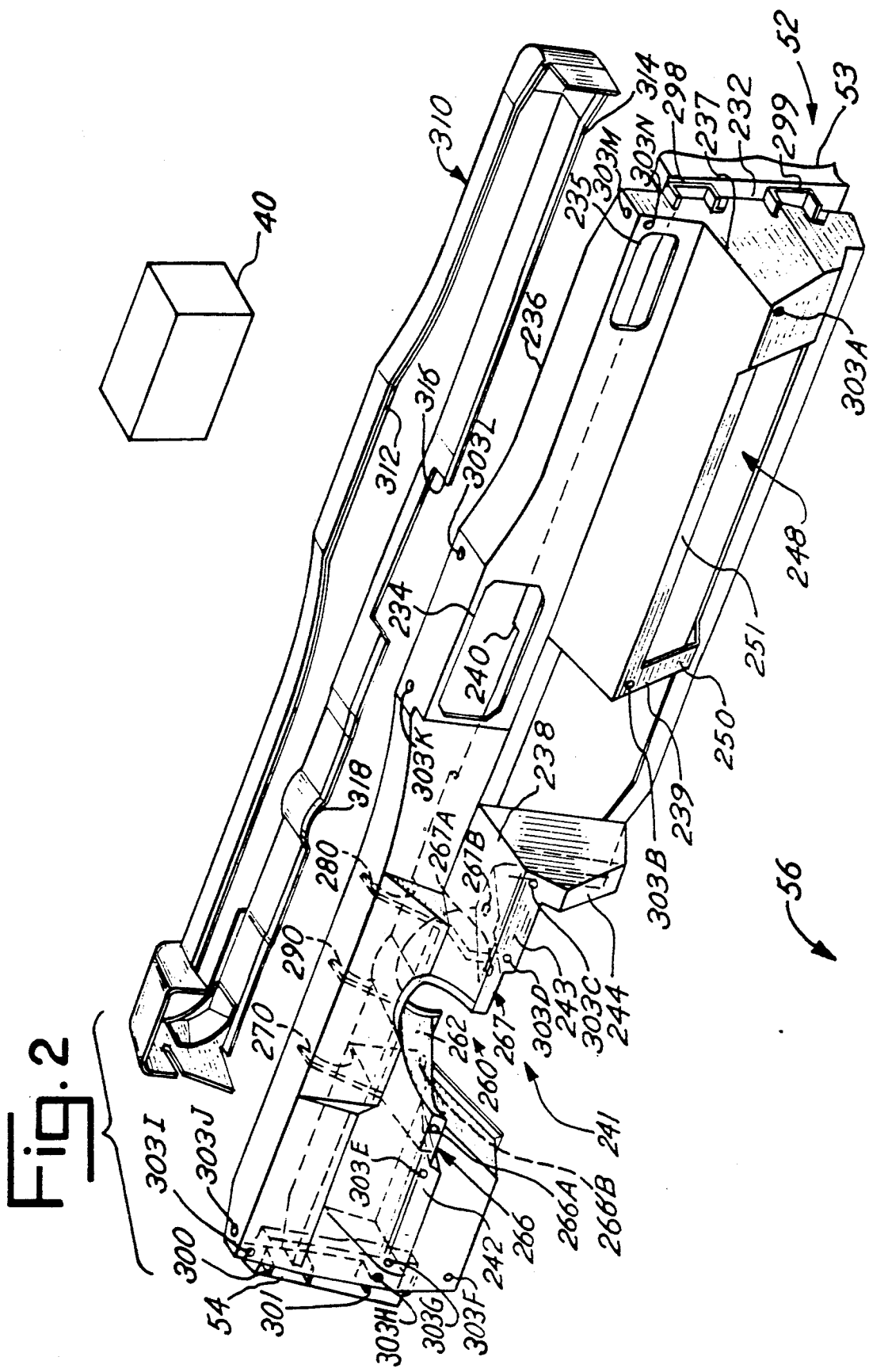
FIG. 2 is an enlarged, exploded, perspective view of the beam assembly shown in FIG. 1.

A vehicle for use in connection with the present invention includes an engine 40 (FIG. 1) having an idle excitation frequency. The idle excitation frequency is the frequency at which the idling engine vibrates on the body of the vehicle. Referring to the drawings, a preferred form of a multifunctional cross vehicular assembly made in accordance with the present invention is adapted for use in connection with a motorized vehicle (not shown) incorporating a cowl 50 (FIG. 9) and a body 52 having side portions schematically shown as 53 and 54 (FIGS. 1 and 2). The body has a first bending mode frequency. The motorized vehicle, including body portions 53 and 54, defines opposite sides of a compartment 56 that holds a driver (not shown) and a passenger (not shown).

Referring to the drawings, a multifunctional cross vehicular assembly made in accordance with a preferred form of the present invention basically comprises a knee bolster assembly 90, an instrument panel 150, an airbag mechanism 170, a steering column assembly 190, an air distribution blower unit 200, and a beam assembly 230.

Referring to FIGS. 1 and 3-5, knee bolster assembly 90 comprises a driver bolster 92 that includes a 1.5-2.0 millimeter thick steel plate 94 that is adapted to deform upon impact. The plate has an upper edge 95, a right edge 96 and a left edge 97 that are supported by beam assembly 230. Plate 94 is attached to beam assembly 230 by fastening holes 98-100. Knee bolster 90 is covered by a vinyl cover 104 (FIG. 4).

Figure 9:
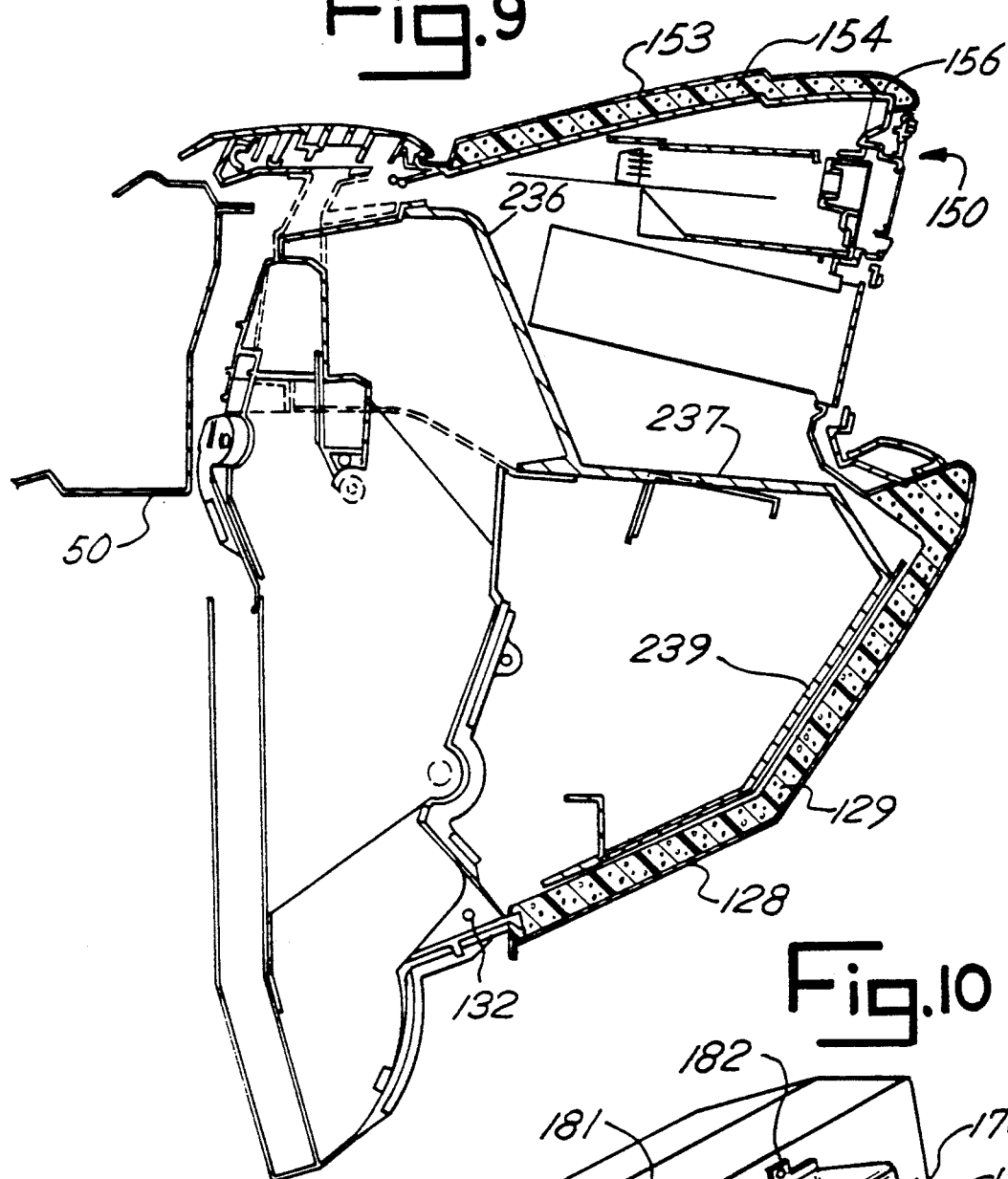
FIG. 9 is an enlarged, cross sectional view taken along line 9—9 in FIG. 3.

Referring to FIGS. 1, 3, 5 and 9, knee bolster assembly 90 also includes a passenger bolster assembly 120 incorporating a glove compartment box 122 that is fitted with a 1.5-2.0 millimeter thick steel plate 126 capable of deformation upon impact. Assembly 120 is covered with a vinyl skin 128 supported by foam 129 (FIG. 9). Glove compartment box 122 is movable on a piano hinge 132.

Referring to FIGS. 1 and 9, instrument panel 150 comprises a vinyl cover 152 that includes a vinyl sheet 153 supported by foam 154 (FIG. 9). Instrument panel 150 is fabricated from a hard plastic shell 156 (FIG. 9).

Figure 10:
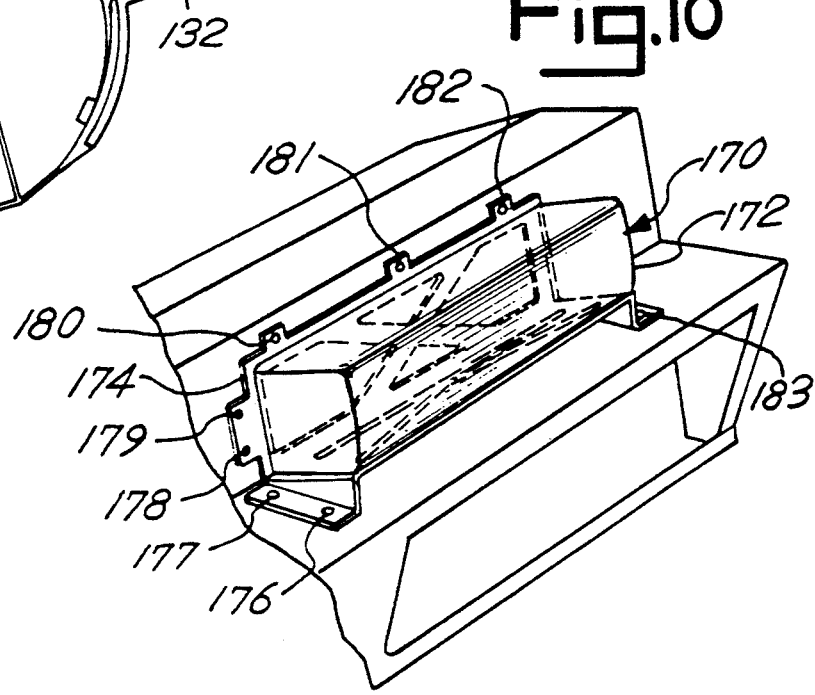
FIG. 10 is a fragmentary, enlarged view of the right hand portion of the beam assembly shown in FIG. 2 with an airbag mechanism attached.

Referring to FIGS. 1, 3 and 10, airbag mechanism 170 includes a cover 172 that is attached to a frame 174. The frame, in turn, is attached to beam assembly 230 by attachment holes 176-183 (FIG. 10).

Referring to FIG. 1, steering column assembly 190 comprises a steering column 192 that supports a conventional steering wheel 194.

Referring to FIG. 1, the vehicle in which the preferred embodiment may be used includes an air distribution blower unit 200 incorporating a blower motor and fan (not shown) for distributing air into the compartment of the vehicle.

Referring to FIGS. 2-9, beam assembly 230 comprises a structural beam 232 integrally diecast from magnesium. This is an important feature of the preferred embodiment which enables the beam to exhibit strength and lightweight. In addition, the integral form substantially reduces the assembly time when the beam is fitted into the body of the vehicle. Beam 232 defines air distribution inlets 234 and 235, as well as a duct portion 236, shelf portions 237 and 238 and a depending portion 239. Duct portion 236 partially defines air distribution ducts that transmit air to inlets 234 and 235. A cut-out portion 240 (FIG. 2) admits air into the duct from blower unit 200.

Referring to FIGS. 2 and 3, beam 232 includes edge portions 242-244 that support the edges of knee bolster 92 in the manner shown in FIG. 3. Edge portions 242-244 also define a cavity 241 that enables the center portion of the knee bolster to deform upon impact to absorb kinetic energy from the driver's knees. This is an important feature which enables the knee bolster assembly to be supported by a single integral unit.

Still referring to FIGS. 2 and 3, edge portions 250 and 251 of beam 232 support the upper and left hand edges of plate 126 in the manner shown in FIG. 3. Edges 250 and 251 also define a cavity 248 into which glove compartment box 122 is placed. The cavity enables the central portion of plate 126 to deform upon impact in order to absorb kinetic energy from the knees of a passenger. This is an important feature that enables the passenger knee bolster to be supported by a single integral structure, thereby reducing weight and assembly time. Beam 232 comprises integral structural members having a mean thickness of 2.5-7.0 millimeters.

Beam 232 also defines a steering column opening 260, bounded by an arch member 262, for receiving steering column 192. Mounting surfaces 266 and 267 are integrally formed in beam 232 in order to support steering column 192. Nuts 266A and 266B are inserted into surface 266 in the molding process. Nuts 267A and 267B also are inserted into surface 267 in the molding process. The nuts are inserted into the mold before casting beam 232. Then the mold is filled to contain the nuts. One face of the nuts is mounted flush to an adjacent mounting surface so that steering column 192 can be attached from under beam 232.

In order to support steering column 192 and to help improve the structural feel of the steering column, ribs 270, 280 and 290 are integrally formed with beam 232. Referring to FIGS. 2-8, rib 270 includes an arc edge 272, an upper lip 274 and a lower lip 276. Rib 280 likewise includes an arc edge 282, an upper lip 284 and a lower lip 286. Rib 290 also includes an arc edge 292, an upper lip 294 and a lower lip 296. The ribs are an important feature of the preferred embodiment because they support the steering column without the necessity for extra frame members that add weight and assembly complexity.

Referring to FIGS. 2 and 3, attachment tabs 298-301 are integrally formed with beam 232 in order to provide a means of securely fastening the beam to the body of a vehicle. Clip base nuts 303A-303N provide a means for attaching instrument panel 150 to beam 232.

Referring to FIGS. 2-8, beam assembly 230 also includes a front cover 310 that is integrally formed and defines an upper lip 312, a lower lip 314 and a cut-out portion 316 that comates with cut-out portion 240 in order to admit air from blower unit 200. Cover 310 also includes an arch 318 that mates with arch 262 in beam 232. Cover 310 comprises integral structural members having a mean thickness of 1.5-3.0 millimeters. Cover 310 preferably is fabricated from vinyl ester base sheet molding compound (SMC) sheet molding compound or thermal plastic engineering resins sold under the trade name Pulse 869 manufactured by Dow Chemical Company. Referring to FIG. 5, lips 312 and 314 of cover 310 are attached to duct portion 236 of beam 230 by a suitable adhesive in the manner shown.

Beam 232 is rigidly fastened to the body of a vehicle by means of tabs 298-301. As shown in FIGS. 2 and 9, beam 232 extends substantially across the entire width of the compartment of a vehicle between cowl 50 and instrument panel 150. This is an important feature which enables beam 232 to form a structural member that can adequately support steering column assembly 190, as well as the other pieces of equipment shown in the drawings.

Instrument panel 150 is connected to nuts 303A-303N in beam 232 by conventional screws or rivets. The nuts are inserted into the mold before casting beam 232. Then the mold is filled to contain the nuts. One face of the nuts is flush to an adjacent surface of beam 232. Cover 152 is fitted to instrument panel 150 by conventional attachment means.

Steering column 192 is rigidly attached to beam 232 by studs that have two sided threads with opposite turns. The threads fit through holes in opposed halves of a conventional clam shell column collar (not shown) that is fitted around steering column 192 during assembly. One side of the threads secure the collar and steering column to nuts 266A, 266B, 267A and 267B. The other side of the threads secure the collar and steering column to nuts that hold the underside of the collar against the steering column.

The shape of beam 232, including ribs 270, 280 and 290, as well as the attachment of the steering column in the position shown, is an important feature of the preferred embodiment. By using the arrangement shown, the first bending mode frequency of the combination of steering column assembly 190 and beam 232 is greater than the first bending mode frequency of the body of the vehicle alone and is also different from the engine idle excitation frequency. Those skilled in the art appreciate that this is an important advance in the art which substantially improves the feel of the steering wheel from the viewpoint of the driver.

In the event of a collision, if the driver or passenger are not wearing lap seat belts, the forward motions of their upper bodies are intended to be restrained by an airbag or upper torso belt. The forward motion of their legs are intended to be restrained by driver bolster 92 and passenger bolster 120 which absorb kinetic energy from the knees of the driver and passenger, respectively. The amount of kinetic energy absorbed can be carefully controlled, because the bolsters are fabricated from uniform steel plates 94 and 126 that can be calibrated with relative ease.

According to an important feature, beam 232 transfers force from the knee bolsters without absorbing substantial kinetic energy from the knees of the driver or passenger in the event of a collision.

According to another important feature, beam 232 transfers force from the body of the vehicle to knee bolster plates 94 and 126 during a collision. Such transfer of force stabilizes the position of the knee bolster plates relative to the body of the vehicle during a collision. Kinetic energy from the knees of the driver and/or passengers is absorbed by the knee bolster plates. By fabricating and fastening the components in the manner described, the knee bolsters plates are enabled to cushion and limit the movement of the knees of the driver and passenger in the event of a collision.

The various preferred versions or embodiments of the invention described in detail above are intended only to be illustrative of the invention. Those skilled in the art will recognize that modifications, additions and substitutions can be made in the various features and elements of the invention without departing from the true spirit and scope of the invention. The following claims are intended to cover the true spirit and scope of the invention.

What we claim is:

1. A multifunctional structural cross vehicular beam assembly for supporting an instrument panel, an air bag mechanism, a driver knee bolster, a passenger knee bolster and a steering column of a motorized vehicle operable by a driver, said steering column having a predetermined first bending mode frequency, said vehicle including an engine having an idle excitation frequency and including a body having a first bending mode frequency, a cowl and a compartment for one or more passengers, said beam assembly comprising:

a beam extending across substantially the entire width of said compartment between said cowl and said instrument panel, said beam integrally comprising
first means for defining a first cavity enabling deformation of said driver knee bolster and for supporting the position of a plurality of edges of said driver knee bolster with respect to said body so that said driver knee bolster absorbs kinetic energy resulting from impact,
second means for defining a second cavity enabling deformation of said passenger knee bolster and for supporting the position of a plurality of edges of said passenger knee bolster with respect to said body so that said passenger knee bolster absorbs kinetic energy resulting from impact,
third means for supporting said air bag mechanism,
fourth means for supporting said steering column to alter the structural feel of said steering column comprising means for defining integral reinforcing ribs arranged so that a first bending mode frequency of the combination of said steering column and said beam is different from said first bending mode frequency of said steering column alone,
fifth means for defining air distribution inlets for said passenger compartment,
sixth means for support said instrument panel, and
cover means connected to said beam for defining channels of an air distribution system for said passenger compartment.

2. A beam assembly, as claimed in claim 1, wherein said beam is die-cast from magnesium.

3. A beam assembly, as claimed in claim 1, wherein said cover means is integrally formed.

4. A beam assembly, as claimed in claim 3, wherein said cover means comprises integral structural members having a mean thickness of 1.5 to 3.0 mm.

5. A beam assembly, as claimed in claim 3, wherein said cover means is molded from a plastic material.

6. A beam assembly, as claimed in claim 5, wherein said plastic material is vinyl ester base sheet molding compound.

7. A beam assembly, as claimed in claim 1, wherein said driver knee bolster and said passenger knee bolster each comprise a steel plate having a thickness of about 1.5 to 2.0 millimeters.

8. A beam assembly, as claimed in claim 1, wherein said first bending mode frequency of the combination of said steering column and said beam is greater than said first bending mode frequency of said body.

9. A beam assembly, as claimed in claim 1, wherein said first bending mode frequency of the combination of said steering column and said beam is different from said idle excitation frequency.

10. A beam assembly, as claimed in claim 1, wherein said beam comprises integral structural members having a mean thickness of 2.5 to 7.0 mm.

11. A multifunctional structural cross vehicular beam assembly for supporting an instrument panel and a steering column of a motorized vehicle operable by a driver, said steering column having a first bending mode frequency, said vehicle including an engine having an idle excitation frequency and including a body having a cowl and a compartment for one or more passengers and having a first bending mode frequency, said beam assembly comprising;

a beam extending across substantially the entire width of said compartment between said cowl and said instrument panel, said beam integrally comprising means for supporting said steering column so that the first bending mode frequency of the combination of said steering column and said beam is greater than said first bending mode frequency of said body and is different from said idle excitation frequency and means for supporting said instrument panel; and cover means connected to said beam for defining channels of an air distribution system for said passenger compartment, whereby the feel of said steering column is improved and said instrument panel is supported.

12. A beam assembly, as claimed in claim 11, wherein said vehicle further comprises an air bag mechanism, a driver knee bolster, a passenger knee bolster and wherein said beam further integrally comprises:

first means for defining a first cavity enabling deformation of said driver knee bolster and for supporting the position of a plurality of edges of said driver knee bolster with respect to said body so that said driver knee bolster absorbs kinetic energy resulting from impact;

second means for defining a second cavity enabling deformation of said passenger knee bolster and for supporting the position of a plurality of edges of said passenger knee bolster with respect to said body so that said passenger knee bolster absorbs kinetic energy resulting from impact;

third means for supporting said air bag mechanism; and fourth means for defining air distribution inlets for said passenger compartment.

13. A beam assembly, as claimed in claim 11, wherein said beam is die-cast from magnesium.

14. A beam assembly, as claimed in claim 11, wherein said cover means is integrally formed.

15. A beam assembly, as claimed in claim 14, wherein said cover means comprises integral structural members having a mean thickness of 1.5 to 3.0 mm.

16. A beam assembly, as claimed in claim 14, wherein said cover means is molded from a plastic material.

17. A beam assembly, as claimed in claim 16, wherein said plastic material is vinyl ester base sheet molding compound.

18. A beam assembly, as claimed in claim 11, wherein said driver knee bolster and said passenger knee bolster each comprise a steel plate having a thickness of about 1.5 to 2.0 millimeters.

19. A beam assembly, as claimed in claim 11, wherein said means for supporting comprises means for defining integral reinforcing ribs arranged so that the first bending mode frequency of the combination of said steering column and said beam is different from the first bending mode frequency of said steering column alone.

* * * * *